US012607134B2

(12) United States Patent
Duval et al.

(10) Patent No.: US 12,607,134 B2
(45) Date of Patent: Apr. 21, 2026

(54) CASE COMPRISING INTERNAL AND/OR EXTERNAL STIFFENERS

(71) Applicant: SAFRAN AIRCRAFT ENGINES, Paris (FR)

(72) Inventors: Sylvain Yves Jean Duval, Moissy-Cramayel (FR); Arnaud Lasantha Genilier, Moissy-Cramayel (FR); Olivier Renon, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 10 days.

(21) Appl. No.: 18/036,035

(22) PCT Filed: Nov. 17, 2021

(86) PCT No.: PCT/FR2021/052027

§ 371 (c)(1),
(2) Date: May 9, 2023

(87) PCT Pub. No.: WO2022/112685

PCT Pub. Date: Jun. 2, 2022

(65) Prior Publication Data

US 2024/0018882 A1 Jan. 18, 2024

(30) Foreign Application Priority Data

Nov. 27, 2020 (FR) ....................................... 2012279

(51) Int. Cl.
*F01D 25/24* (2006.01)
*F01D 25/04* (2006.01)
*F01D 25/30* (2006.01)

(52) U.S. Cl.
CPC ........... *F01D 25/243* (2013.01); *F01D 25/04* (2013.01); *F01D 25/30* (2013.01); *F05D 2220/3215* (2013.01); *F05D 2260/941* (2013.01)

(58) Field of Classification Search
CPC ........ F01D 25/243; F01D 25/04; F01D 25/30; F01D 9/041; F01D 9/042; F01D 9/065; F05D 2220/3215; F05D 2260/941
See application file for complete search history.

(56) References Cited

U.S. PATENT DOCUMENTS 5,056,738 A * 10/1991 Mercer ...................... F01D 5/16 D12/345
7,128,536 B2 * 10/2006 Williams .............. F04D 29/668 416/500

(Continued)

FOREIGN PATENT DOCUMENTS

CN 103062102 A 4/2013
EP 2003293 A1 12/2008

(Continued)

OTHER PUBLICATIONS

French Search Report dated Sep. 10, 2021 in French Application No. FR2012279.

(Continued)

*Primary Examiner* — Nathaniel E Wiehe
*Assistant Examiner* — Wayne A Lambert
(74) *Attorney, Agent, or Firm* — Sughrue Mion, PLLC

(57) ABSTRACT

The invention relates to a turbine engine case (1), extending around an axis, said case (1) comprising: a hub comprising an outer wall (21) and an inner wall (22) between which an annular flange (23) extends; an outer shell (3); a plurality of arms (4) which each extend between the hub and the outer shell (3); the case (1) further comprising a plurality of main stiffeners (5), each being disposed in the extension of an arm (Continued)

(4) between the outer wall (21) and the inner wall (22) projecting from the flange (23), each main stiffener (5) comprising two ribs (51, 52) arranged opposite one another and which move away from one another from the outer wall (21) towards the inner wall (22).

9 Claims, 5 Drawing Sheets

(56) References Cited

U.S. PATENT DOCUMENTS

| | | | | |
|---|---|---|---|---|
| 8,083,478 | B2 * | 12/2011 | Bader | F01D 9/065 415/211.2 |
| 8,998,575 | B2 * | 4/2015 | Lucashu | F01D 9/04 415/190 |
| 9,689,312 | B2 * | 6/2017 | Sjöqvist | F01D 25/28 |
| 10,012,108 | B2 * | 7/2018 | Amnell | F01D 25/24 |
| 11,629,615 | B2 * | 4/2023 | Lefebvre | F01D 25/26 415/220 |
| 2004/0103534 | A1 * | 6/2004 | Lundgren | B23P 15/04 29/889.22 |
| 2007/0264128 | A1 | 11/2007 | Grudnoski et al. | |
| 2009/0269203 | A1 * | 10/2009 | Care | F01D 25/06 416/221 |
| 2010/0275572 | A1 * | 11/2010 | Durocher | F01D 9/065 60/797 |
| 2013/0064647 | A1 | 3/2013 | Hashimoto | |
| 2013/0101399 | A1 | 4/2013 | Chrabascz et al. | |
| 2013/0280045 | A1 * | 10/2013 | Dolansky | F01D 5/26 416/232 |
| 2014/0112772 | A1 * | 4/2014 | Duval | F02C 7/20 415/215.1 |
| 2014/0341730 | A1 * | 11/2014 | Kullenberg | F01D 25/162 415/211.2 |
| 2015/0082769 | A1 | 3/2015 | Noel et al. | |
| 2015/0132110 | A1 * | 5/2015 | Mountz | F02K 1/386 415/213.1 |
| 2015/0204212 | A1 * | 7/2015 | Mountz | F01D 25/24 415/200 |
| 2015/0285098 | A1 * | 10/2015 | De Sousa | F01D 25/243 415/214.1 |
| 2016/0076398 | A1 * | 3/2016 | Shteyman | F01D 25/30 29/889.22 |
| 2018/0195416 | A1 * | 7/2018 | Jouy | F01D 25/30 |
| 2019/0249570 | A1 * | 8/2019 | Barua | B22F 5/009 |
| 2020/0325796 | A1 * | 10/2020 | Debray | F01D 25/24 |
| 2021/0003017 | A1 * | 1/2021 | Garner | F01D 5/16 |

FOREIGN PATENT DOCUMENTS

| | | | |
|---|---|---|---|
| EP | 1447543 | B1 | 9/2012 |
| EP | 3705686 | A1 | 9/2020 |
| FR | 3050229 | A1 | 10/2017 |
| GB | 2402717 | A | 12/2004 |

OTHER PUBLICATIONS

International Search Report dated Feb. 7, 2022 in International Application No. PCT/FR2021/052027.

Written Opinion dated Feb. 7, 2022 in International Application No. PCT/FR2021/052027.

Office Action issued May 22, 2025 in Chinese Patent Application No. 202180077102.1.

* cited by examiner

CASE COMPRISING INTERNAL AND/OR EXTERNAL STIFFENERS

CROSS REFERENCE TO RELATED APPLICATIONS

This application is a National Stage of International Application No. PCT/FR2021/052027 filed Nov. 17, 2021, claiming priority based on French Patent Application No. 2012279 filed Nov. 27, 2020, the contents of each of which being herein incorporated by reference in their entireties.

GENERAL TECHNICAL FIELD

The invention relates to a turbomachine casing and in particular a turbomachine exhaust casing.

STATE OF THE ART

The exhaust casing is a structural part of a turbomachine disposed at the outlet of a turbine, the outlet comprising a gas ejection nozzle.

The casing conventionally comprises a hub, an external shroud and radial arms disposed circumferentially between the hub and the outer shroud.

In order to fix the exhaust casing to a turbomachine support (a pylon for example), devises protruding from the outer shroud are provided.

The exhaust casing is therefore subjected to tensile and compressive forces which can damage the casing as well as the arms of the casing. It is particularly at the junction between the hub and the arms that the stresses are the greatest and that the forces are high.

To enable the casing to withstand these stresses, it is usual to provide for extra thicknesses in the high-stress areas, which leads to an increase in the mass of the structure.

PRESENTATION OF THE INVENTION

The invention proposes to improve the force resistance of a turbomachine casing.

To this end, the invention proposes, according to a first aspect, a turbomachine casing, extending about an axis, said casing comprising:

- a hub comprising an outer wall and an inner wall between which an annular flange extends;
- an outer shroud;
- a plurality of arms which each extend between the hub and the outer shroud;
  - the casing further comprising a plurality of main stiffeners, each being disposed in the extension of an arm between the outer wall and the inner wall protruding from the flange, each stiffener comprising two ribs disposed facing each other and which move apart from each other by moving away from the outer wall towards the inner wall.

The invention, according to the first aspect, is advantageously completed by the following characteristics, taken alone or in any one of their technically possible combination.

Each rib comprises a rod disposed in the extension of an arm.

The two ribs of each main stiffener extend relative to each other by moving apart circumferentially on either side of an arm.

The casing further comprises secondary stiffeners each comprising two plates oppositely attached to the ribs of each main stiffener by leaving a gap therebetween, said gap constituting a clearance adapted to be consumed in case of deformation of one or several ribs.

The casing further comprises inner stiffeners disposed extending facing each other in each of the arms and each extending between two opposite walls of the arm.

The inner stiffeners are disposed in the portion of the arm that has the greatest thickness along the transverse direction of said arm.

Each inner stiffener comprises a rod extended by a head, the heads of said rods being disposed opposite each other by leaving a gap therebetween, said gap constituting a clearance adapted to be consumed in case of deformation of the arm.

The heads disposed opposite each other have complementary shapes and preferably have a circular or rectangular section forming a complementary male and female portion.

Each arm has a main direction of extension, each inner stiffener of each arm extends mainly in the arm along the main direction of extension of the arm.

The invention proposes according to a second aspect a turbomachine comprising a casing according to the first aspect of the invention.

The invention proposes according to a third aspect an aircraft comprising a turbomachine according to the second aspect of the invention.

The provision of main stiffeners possibly coupled with secondary and/or inner stiffeners leads to a stiffening of the casing when it is subjected to strong stresses which allows it to better support them.

In addition, the addition of the stiffeners avoids providing extra thicknesses in the areas concerned and therefore limits the increase in the mass of the structure.

The resulting casing is therefore both resistant and lighter than a known casing that would have extra thicknesses for the resistance to stresses.

PRESENTATION OF THE FIGURES

Other characteristics, aims and advantages of the invention will emerge from the following description, which is purely illustrative and not limiting, and which should be read in relation to the appended drawings in which.

In all the figures, similar elements bear identical references.

DETAILED DESCRIPTION

Figure 1:
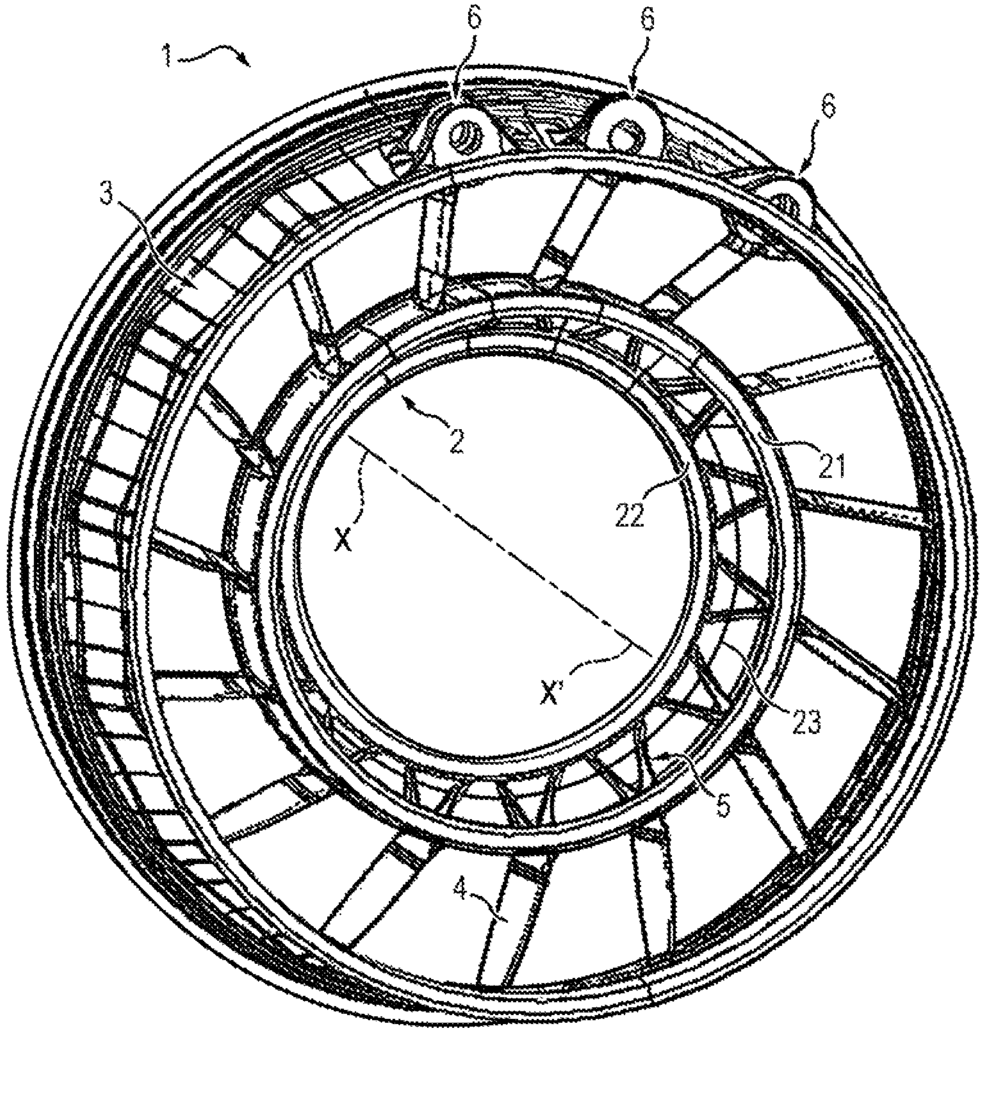
FIG. 1 illustrates an overall view of an exhaust casing according to one embodiment of the invention

FIG. 1 illustrates a turbomachine casing 1 comprising a hub 2 which extends about a longitudinal axis XX'.

In what follows, the terms "inner", "outer", "radial", "axial" are located with respect to this axis, it being understood that an inner element is closer to the axis than an outer element.

Returning to FIG. 1, the hub 2 comprises an outer wall 21 and an inner annular wall 22 between which an annular flange 23 extends.

Radial arms 4 are disposed circumferentially between the hub 2 and an outer shroud 3 of the casing 1. The arms 4 are evenly distributed around the hub 2.

Clevises 6 for connection to a pylon (not represented) of the turbomachine are disposed on the outer shroud 3. In FIG. 1, three connection clevises 6 are present.

Figure 2:
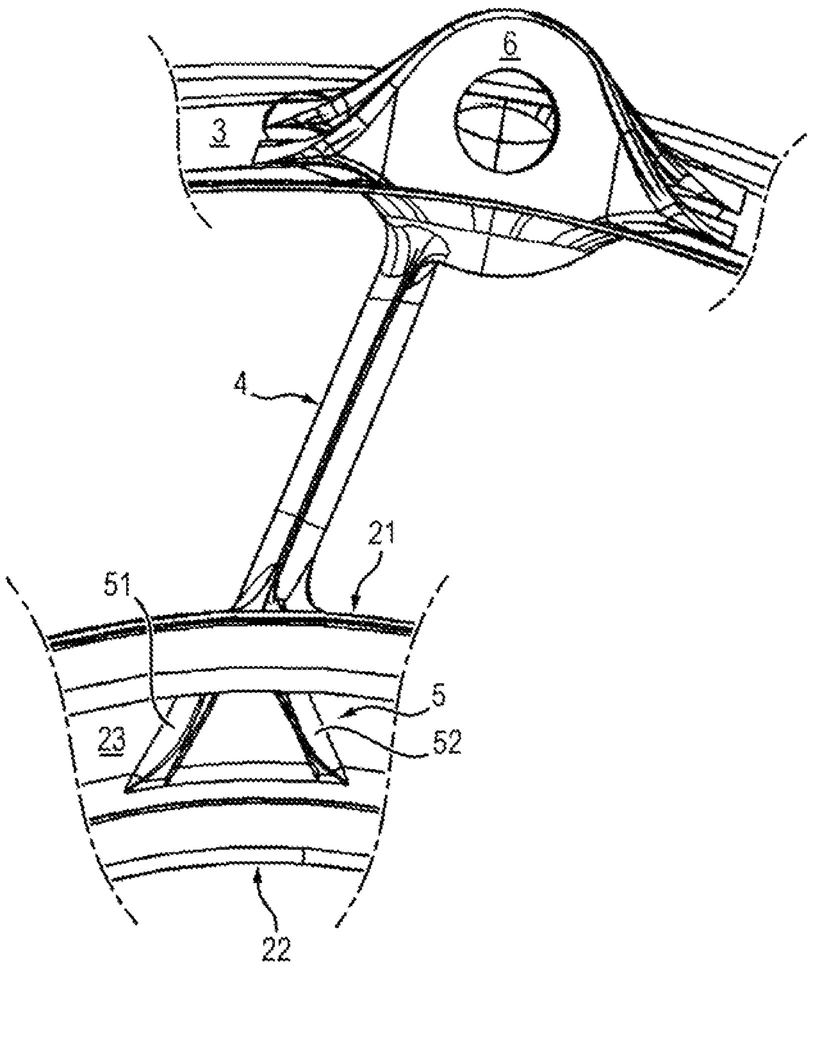
FIG. 2 illustrates a detail of a portion of the exhaust casing according to one embodiment of the invention.
Figure 3:
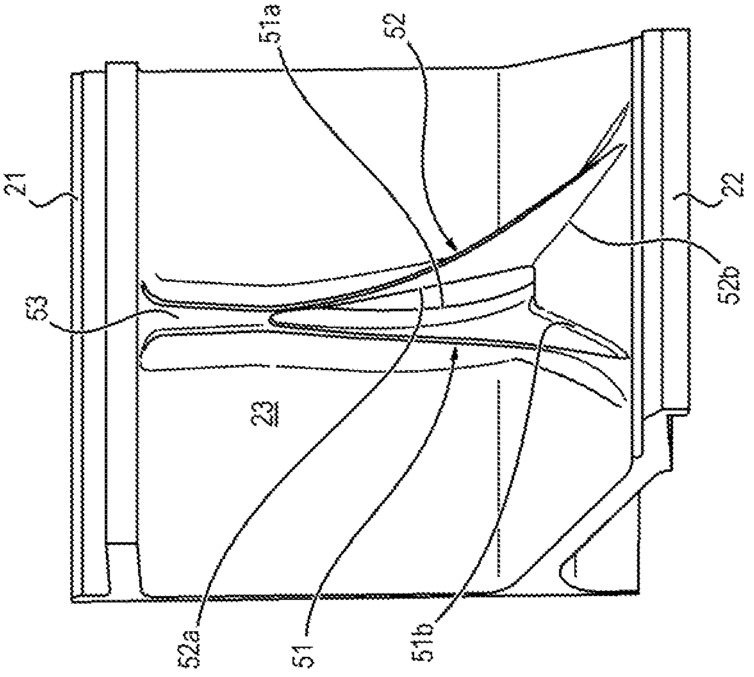
FIGS. 3 and 4 illustrate a detail of a rib of an exhaust casing according to one embodiment of the invention.

In relation to FIGS. 2 and 3, to reinforce the casing at the level of the arms, the latter comprises radial main stiffeners 5 which extend each arm. These main stiffeners 5 are particularly disposed inside the hub 2 and protrude from the annular flange 23. As can be seen in FIG. 2, each main stiffener 5 is generally substantially V-shaped.

Particularly, the main stiffeners 5 extend by moving apart circumferentially on either side of each arm 4. As such and advantageously, each main stiffener comprises two ribs 51, 52 opposite each other which extend by moving apart from a downstream rod 53 which is directly disposed in the extension of an arm 4. The two ribs 51, 52 are constituted by walls which move apart by extending from the rod 53 towards the flange 23 up to the inner wall 22.

As in particular seen in FIG. 3, one side 51*a*, 52*a* of each rib is in contact with the flange 23 while another side 51*b*, 52*b* of each rib is in contact with the inner wall 22.

These main stiffeners 5 are evenly disposed inside the hub 2 as can be seen in FIG. 1.

This provision of the main stiffeners 5 makes it possible to enhance the mechanical strength of the casing at the level of the arms 4.

Figure 4:
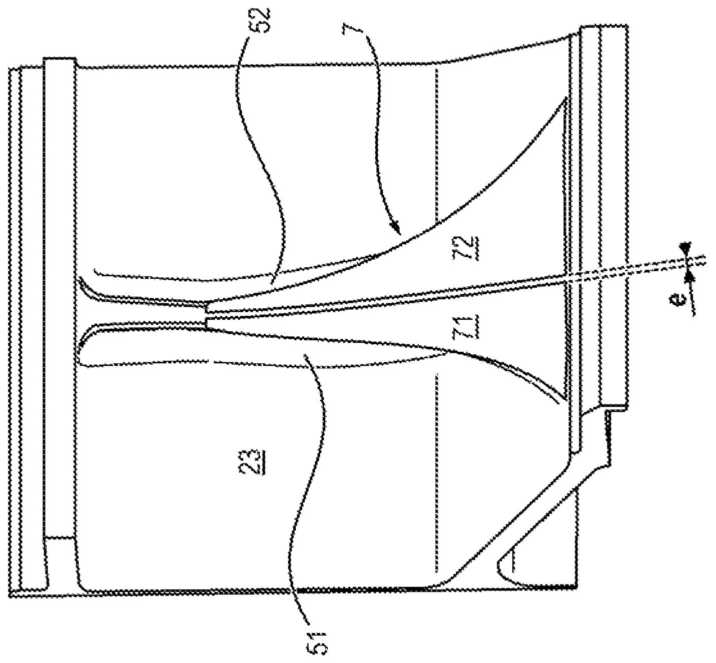

Complementarily, in relation to FIG. 4, secondary stiffeners 7 are attached to the main stiffeners 5: one secondary stiffener 7 per main stiffener 5. Particularly, these secondary stiffeners 7 are formed by two plates 71, 72 opposite each other attached to the ribs 51, 52 of the main stiffeners 5 by leaving a gap therebetween, said gap (denoted “e” in the figure) constituting a clearance suitable to be consumed in case of deformation of the main stiffeners 5. Indeed, when the main stiffeners 5 will deform, the two plates 71, 72 of the secondary stiffeners 7 will come closer together thanks to the clearance and come into contact. This contact has the effect of taking up the forces, globally rigidifying the hub and preventing excessive deformations at this level.

Complementarily to the main and/or secondary stiffeners positioned in the hub, the casing can comprise inner stiffeners disposed in the structure of the arm.

Figure 5:
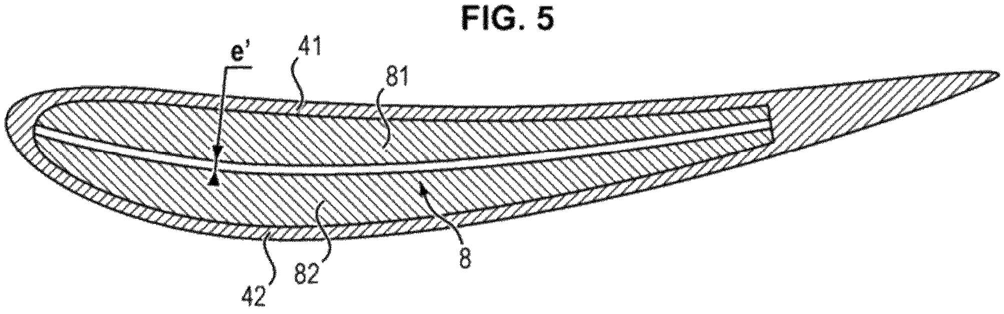
FIG. 5 illustrates an arm comprising inner ribs according to one embodiment of the invention.

According to one embodiment, illustrated in FIG. 5, an inner stiffener 8 is disposed perpendicularly to the axis Y of the arm (defining a main direction of the arm). Such an inner stiffener 8 comprises two inner ribs 81, 82 opposite each other inside the arm and disposed with a gap e' so as to constitute a clearance adapted to be consumed in case of deformation of the arm. Particularly, the ribs 81, 82 extend from two opposite walls 41, 42 of the arm 4. The inner ribs 81, 82 fill the arm by leaving the clearance e' in the middle. The inner ribs 81, 82 are therefore opposite each other. The shape of each inner rib 81, 82 can be similar to an inner platform filling the section with a slot in the middle.

Figure 6:
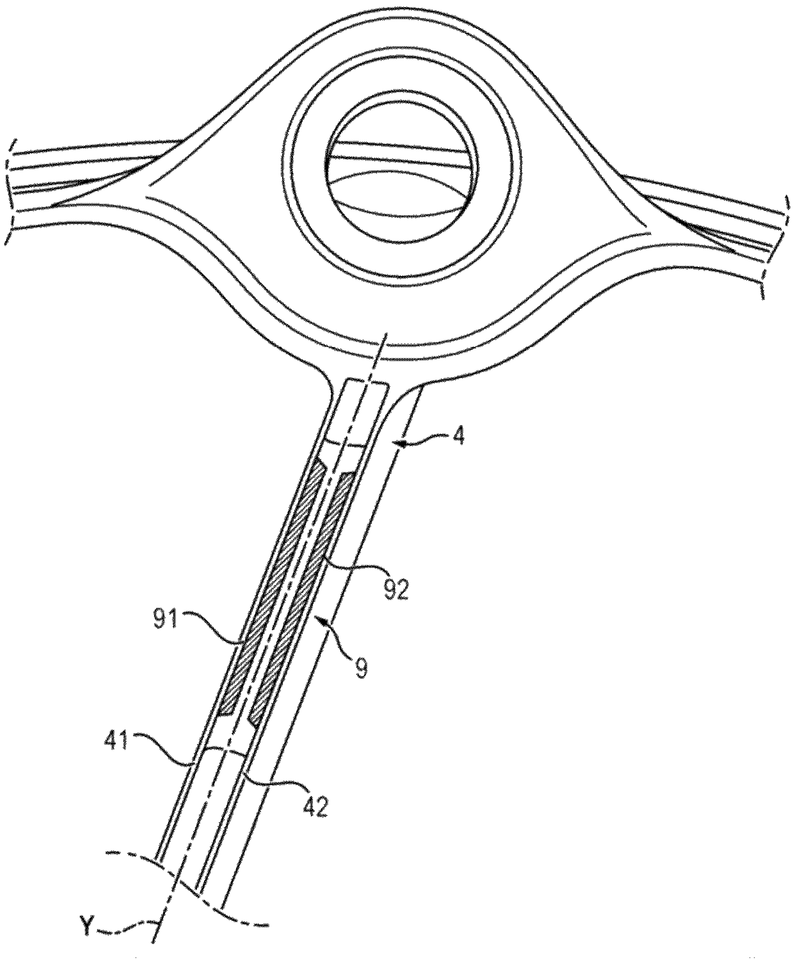
FIGS. 6 to 8 illustrate an arm comprising inner ribs according to one embodiment of the invention.

According to one embodiment illustrated in FIG. 6, an inner stiffener 9 is disposed in the axis of the arm. Such a stiffener 9 comprises two inner ribs 91, 92 opposite each other over part of the length of the arm disposed with a gap therebetween so as to constitute a clearance suitable to be consumed in case of deformation of the arm. Particularly, these ribs 91, 92 are disposed opposite each other on walls 41, 42 of the arm 4.

Figure 7:
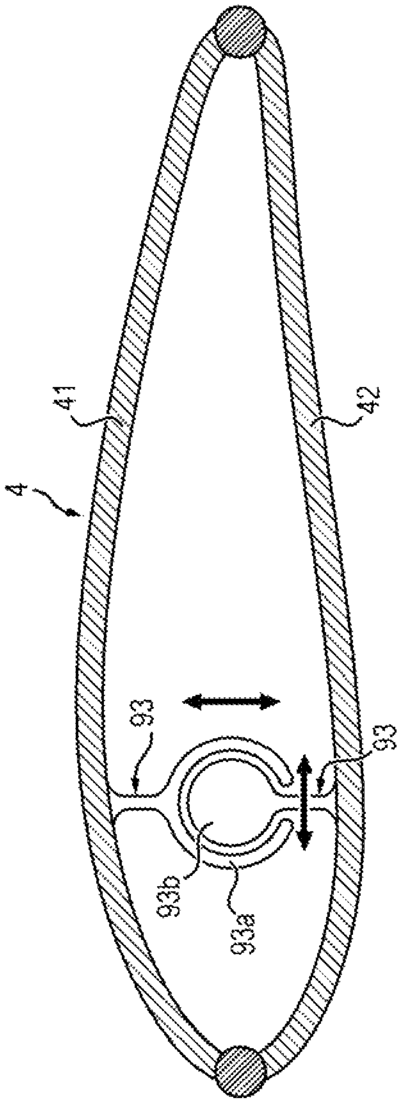
Figure 8:
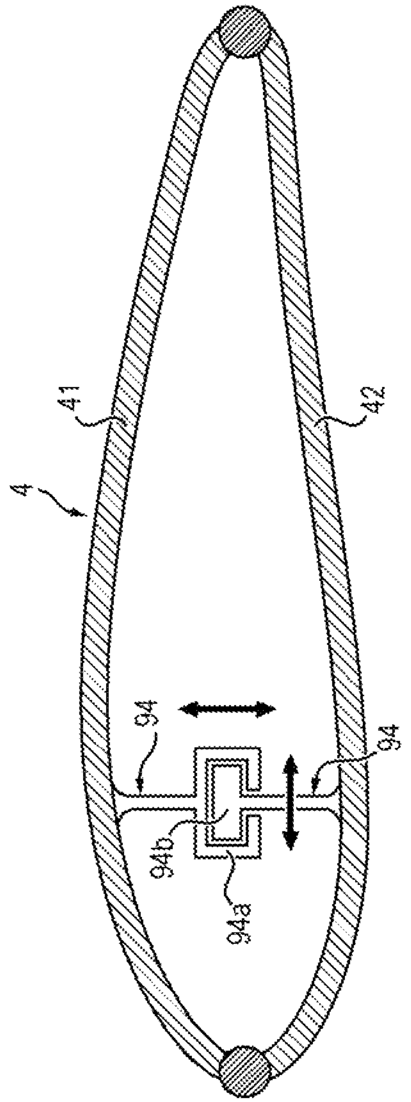

As illustrated in FIGS. 7 and 8, these inner ribs can take the form of rods 93, 94 provided with complementary heads 93*a*, 93*b*, 94*a*, 94*b* of circular or square section and of complementary shape (a male portion and a female portion).

In FIG. 7, the male (O-shaped) portion has a solid spherical or cylindrical section while the female (C-shaped) portion has a spherical or cylindrical section comprising an opening to accommodate the male portion.

In FIG. 8, the male (T-shaped) portion has a solid rectangular section while the female (C-shaped) portion has a rectangular section comprising an opening to accommodate the male portion.

As can be seen in FIGS. 7 and 8, these two portions are disposed relative to each other, leaving a gap in several directions in order to constitute a corresponding clearance which can be consumed in case of deformations of the arms.

These ribs make it possible, after deformation of the arm, to consume the clearance existing between the male portion and the female portion and thus come into contact between the portions 93*a* and 93*b* or between the portions 94*a* and 94*b*. This contact has the effect of taking up the forces, globally stiffening the arm and preventing excessive deformations at this level.

In addition, as is visible in FIGS. 5, 7 and 8, the inner stiffeners are advantageously disposed in the portion of the arm that includes the greatest transverse thickness (the transverse direction being a direction perpendicular to the direction Y of the arm). It is indeed in this area that strong stresses are likely to be applied to the arm.

Complementarily, the inner or outer ribs are obtained by an additive manufacturing method which makes it possible to provide for complex shapes in areas that are difficult to access.

Alternatively, the inner ribs can be made during the manufacture of the arms which could be in two portions assembled together by welding.

The invention claimed is:

1. A turbomachine casing, extending about an axis, the turbomachine casing comprising:

- a hub extending along a longitudinal axis, the hub comprising a radially outer wall and a radially inner wall that is radially separated from the radially outer wall with respect to the longitudinal axis, each of the radially outer wall and the radially inner wall extending along the longitudinal axis such that an outer side of the radially inner wall is opposite to and facing an inner side of the radially outer wall;
- an annular flange extending radially between the inner side of radially outer wall and outer side of the radially inner wall;
- an outer shroud radially separated from an outer side of the radially outer wall;
- a plurality of arms, each extending radially between the outer side of the radially outer wall and the outer shroud; and
- a plurality of main stiffeners, each main stiffener extending radially in an extension direction of an arm and between the inner side of the radially outer wall and the outer side of the radially inner wall, and each main stiffener protruding from the annular flange and extending radially along the annular flange, wherein each main stiffener comprises:
  - a rod extending radially from the inner side of the radially outer wall toward the radially inner wall in the extension direction of the arm, and
  - two ribs extending radially from the rod to the outer side of the radially inner wall, wherein the ribs are disposed on opposite sides of the rod and diverging from the rod, the ribs being connected to both the rod and the annular flange, and wherein the ribs move apart from each other as they extend from the rod toward the outer side of the radially inner wall.

2. The turbomachine casing according to claim 1, wherein the two ribs of each main stiffener extend relative to each other by moving apart circumferentially on either side of an arm.

3. The turbomachine casing according to claim 1, comprising secondary stiffeners, each comprising two plates oppositely attached to the ribs of each main stiffener by leaving a gap therebetween, said gap constituting a clearance adapted to be consumed in case of deformation of one or several ribs.

4. The turbomachine casing according to claim 1, further comprising inner stiffeners disposed by extending facing each other in each of the arms and each extending between two opposite walls of the arm.

5. The turbomachine casing according to claim 4, wherein the inner stiffeners are disposed in the portion of the arm that has the greatest thickness along the transverse direction of said arm.

6. The turbomachine casing according to claim 4, wherein each inner stiffener comprises a rod extended by a head, the heads of said rods being disposed opposite each other by leaving a gap therebetween, said gap constituting a clearance adapted to be consumed in case of deformation of the arm.

7. The turbomachine casing according to claim 6, wherein the heads disposed opposite each other have complementary shapes and have a circular or rectangular section forming a complementary male and female portion.

8. The turbomachine casing according to claim 4, wherein each arm has a main direction of extension, each inner stiffener of each arm extends in the arm along the main direction of extension of the arm.

9. A turbomachine comprising the turbomachine casing according to claim 1.

* * * * *